(No Model.)
F. McLAUGHLIN.
FIFTH WHEEL.
No. 482,457. Patented Sept. 13, 1892.
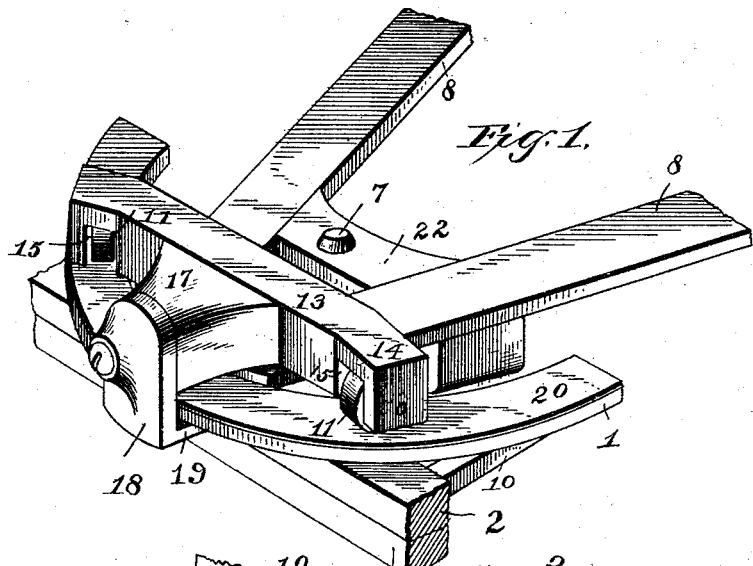
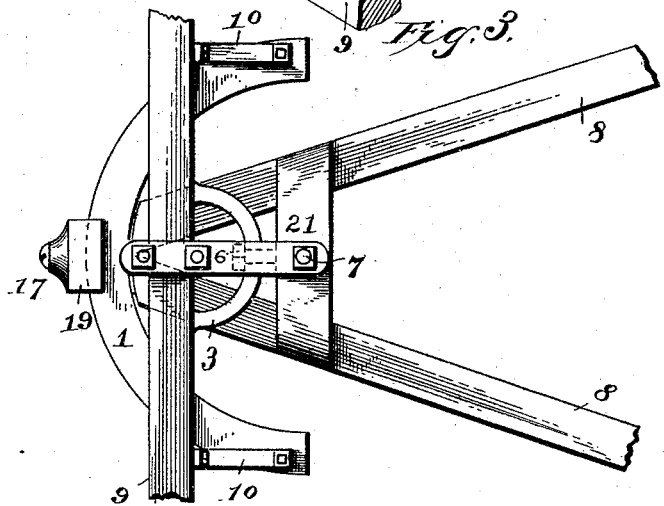
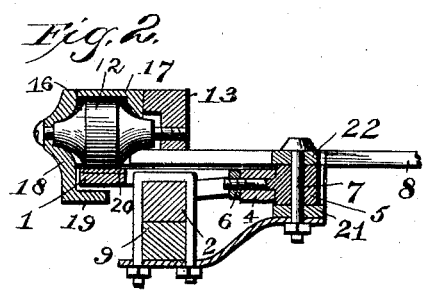
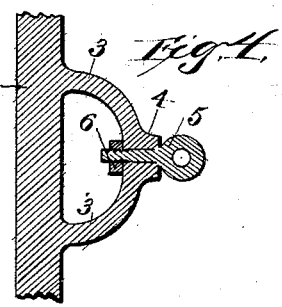
Witnesses
Inventor
Frank McLaughlin
By his Attorneys,
C. A. Snow & Co.

UNITED STATES PATENT OFFICE.

FRANK McLAUGHLIN, OF BAKER'S CORNER, INDIANA.

FIFTH-WHEEL.

SPECIFICATION forming part of Letters Patent No. 482,457, dated September 13, 1892.

Application filed December 31, 1891. Serial No. 416,707. (No model.)

*To all whom it may concern:*

Be it known that I, FRANK MCLAUGHLIN, a citizen of the United States, residing at Baker's Corner, in the county of Hamilton and State of Indiana, have invented a new and useful Fifth-Wheel, of which the following is a specification.

The invention relates to improvements in fifth-wheels.

The object of the present invention is to simplify and improve the construction of fifth-wheels and to enable vehicles to turn in a small space without friction.

The invention consists in the construction and novel combination and arrangement of parts hereinafter fully described, illustrated in the accompanying drawings, and pointed out in the claims hereto appended.

In the drawings, Figure 1 is a perspective view of a fifth-wheel embodying the invention. Fig. 2 is a vertical longitudinal sectional view. Fig. 3 is a reverse plan view.

Like numerals of reference indicate corresponding parts in all the figures of the drawings.

1 designates a curved plate connected by a cross-bar 2, and rearwardly extending from the middle of the transverse bar 2 are curved arms 3, the rear ends of which terminate in a socket 4 to receive the stem of an eyebolt 5. The eyebolt 5 is secured in the socket 4 by a nut 6 and is pivotally connected by a king-bolt 7 with hounds 8. The curved plate 1 is mounted upon an axle 9 and has its ends supported by inclined braces 10, extending rearwardly from the axle, and it forms a track for end rollers 11 and an intermediate roller 12 of a cross-bar 13, which supports the body of a vehicle, whereby the latter may turn in a small space without friction. The ends 14 of the cross-bar 13 extend slightly forward and are arranged at an angle to the main portion of the cross-bar to give the rollers 11 a greater swing without leaving the curved bar. The end rollers 11 are arranged in recesses 15 of the cross-bar 13, centrally secured to the hounds 8 and adapted to support the front spring of a vehicle, and the intermediate roller 12 is arranged in a casing 16. The casing 16 consists of a recessed block 17 and a vertically-disposed L-shaped plate 18, secured to the front end of the block and arranged on front of the curved plate and having its horizontal flange or portion 19 extending rearward from its lower end and arranged beneath the curved plate. In light vehicles the end rollers may be dispensed with; but in drawing heavy loads these rollers are advantageous and necessary. A steel bearing-plate 20 is arranged on the upper face of the curved plate to provide a bearing-surface for the rollers. The eyebolt is pivoted within a depending hanger 21 and between the same and a cross-bar 22, which connects the hounds 8, and the bar 22 and the hanger 21 are provided with openings to receive the king-bolt 7. The king-bolt is arranged considerably in the rear of the front axle to enable a vehicle to turn in a small space, and the rollers which support the body of the vehicle enable a turn to be made without friction.

What I claim is—

1. In a fifth-wheel, the combination of a curved plate forming a track and designed to be mounted on an axle, the bar 13, provided at its ends with recesses, a casing secured at the front of the bar and receiving the curved plate and composed of a recessed block, a vertically-disposed plate secured to the front of the block and having a horizontal flange extending rearward from the lower end of the vertical plate, and rollers arranged in said recesses and in the casing and mounted on the track, substantially as described.

2. In a fifth-wheel, the combination of a curved plate, the cross-bar 13, provided with forwardly-extending ends arranged at an angle to the body of the cross-bar 13, a casing centrally secured to the bar, and rollers mounted on the curved plate and arranged at the ends of the bar 13 and in the casing, substantially as described.

3. In a fifth-wheel, the combination of a curved plate having a transverse bar and provided with rearwardly-extending arms terminating in a socket, an eyebolt journaled in the socket, the cross-bar 13, a casing centrally secured to the bar, and rollers mounted on the curved plate and arranged at the ends of the bar 13 and in the casing, substantially as described.

In testimony that I claim the foregoing as my own I have hereto affixed my signature in the presence of two witnesses.

FRANK McLAUGHLIN.

Witnesses:
GEORGE C. SUMNER,
B. P. MARTIN.